United States Patent [19]

Takeuchi et al.

[11] Patent Number: 4,457,535

[45] Date of Patent: Jul. 3, 1984

[54] WHEELCHAIR

[75] Inventors: Sakazo Takeuchi; Kikuo Ban; Akira Inoue; Hiromitsu Otsuka, all of Ibaraki, Japan

[73] Assignee: Director-General of the Agency of Industrial Science and Technology, Tokyo, Japan

[21] Appl. No.: 517,814

[22] Filed: Jul. 27, 1983

[30] Foreign Application Priority Data

Jul. 29, 1982 [JP] Japan .......................... 57-116027[U]

[51] Int. Cl.[3] ............................................ B62M 1/14

[52] U.S. Cl. .................................... 280/650; 280/42; 280/647

[58] Field of Search ................. 280/242 WC, 42, 647, 280/649, 650; 297/DIG. 4

[56] References Cited

U.S. PATENT DOCUMENTS

| | | | |
|---|---|---|---|
| 909,411 | 1/1909 | Hockney | 297/DIG. 4 |
| 2,561,616 | 7/1951 | Everest et al. | 280/242 WC |
| 3,331,614 | 7/1967 | McClintock | 280/42 |

OTHER PUBLICATIONS

Development of Light Wheelchair With Carbon/Glass Hybrid FRP–FW Pipes, Trans. JSCM, vol. 6, No. 1, Jul. 1980, 9–13.

*Primary Examiner*—Joseph F. Peters, Jr.
*Assistant Examiner*—Donn McGiehan
*Attorney, Agent, or Firm*—Wegner & Bretschneider

[57] ABSTRACT

A wheelchair including a pair of frames located on opposite sides of the wheelchair, each frame being provided with a drive wheel equipped with a hand ring, and a castor; a back rest and a leg rest each formed of a web of flexible material connecting the pair of frames together; yoke members pivotally connected at lower ends to base tubular members of the pair of frames and connected for relative pivotal movements at an intersection while being connected at upper ends to a pair of seat tubular members; a seat formed of a web of flexible material hung between the seat tubular members which are adapted to be maintained at opposite ends in pressing engagement with front post members and rear post members of the pair of frames which are kept in a spaced-apart condition to bring the back rest and leg rest to a taut condition, whereby the back rest, leg rest and seat can have their lengths adjusted to thereby adjust the width of the wheelchair to a desired value.

1 Claim, 2 Drawing Figures

WHEELCHAIR

BACKGROUND OF THE INVENTION

This invention relates to improvements in a wheelchair for a person who is unable to walk.

Wheelchairs have originally been formed of steel pipes arranged in a framework mounted on a pair of wheels for supporting persons who are unable to walk. The steel pipes have provided a rigid support for the riders but have suffered the disadvantage of being heavy in weight. In order to obtain a light weight in a wheelchair, proposals have been made to utilize pipes of fiber-reinforced plastic material to form a framework for supporting the sitter. However, there has been no wheelchair of good construction that satisfactorily meets the requirements of the sitters differing from one another in physique.

SUMMARY OF THE INVENTION

This invention has as its object the provision of a wheelchair of an improved construction having collapsible frames formed from tubular members which is capable of satisfactorily meeting the requirements of the users.

One of the features of the wheelchair according to the invention is that tubular members for supporting a seat formed of a web of flexible material are brought into pressing contact with front post members and rear post members of the pair of frames located on opposite sides of the seat while the seat, a back rest and a leg rest each also formed of a web of flexible material are kept in a taut condition whereby the wheelchair can be assembled to have enough strength and rigidity.

Another feature of the wheelchair according to the invention is that the webs constituting the back rest, seat and leg rest can have their lengths adjusted as desired to enable the spacing interval between the frames located on the opposite sides of the seat to be adjusted, so that the wheelchair can have flexibility in dimensions to fit all persons of different sizes.

Still another feature is that the tubular members for supporting the seat are not rigidily connected to the frames on opposite sides of the seat but have their opposite ends press against the front post members and the rear post members of the frames, and the wheelchair is maintained in assembled condition by spreading the back rest, seat and leg rest which are formed of webs of flexible material, so that the wheelchair as a whole has a flexible construction and shocks transmitted from drive wheels and castors can be absorbed before they reach the sitter.

According to the invention, there is provided a wheelchair comprising a pair of frames located on opposite sides of the wheelchair, each frame being provided with a drive wheel equipped with a hand ring, and a castor; a back rest and a leg rest each formed of a web of flexible material connecting the pair of frames together; yoke members pivotally connected at lower ends to base tubular members of the pair of frames and connected for relative pivotal movements at an intersection while being connected at upper ends to a pair of seat tubular members; a seat formed of a web of flexible material stretched between the seat tubular members maintained at opposite ends in pressing engagement with front post members and rear post members of the pair of frames which are kept in a spaced-apart condition to bring the back rest and leg rest to a taut condition, whereby the back rest, leg rest and seat can have their lengths adjusted to thereby adjust the width of the wheelchair to a desired value.

The wheelchair of the aforesaid construction can be assembled by spacing the left and right frames apart from each other until the back rest and leg rest become taut and pressing the seat downwardly while the left and right frames are in the aforesaid spaced-apart condition until the seat tubular members on opposite sides of the seat are brought into pressing engagement with the front post members and the reat post members of the frames. The wheelchair can be disassembled by performing the aforesaid process in reverse.

DESCRIPTION OF THE PREFERRED EMBODIMENT

Figure 1:
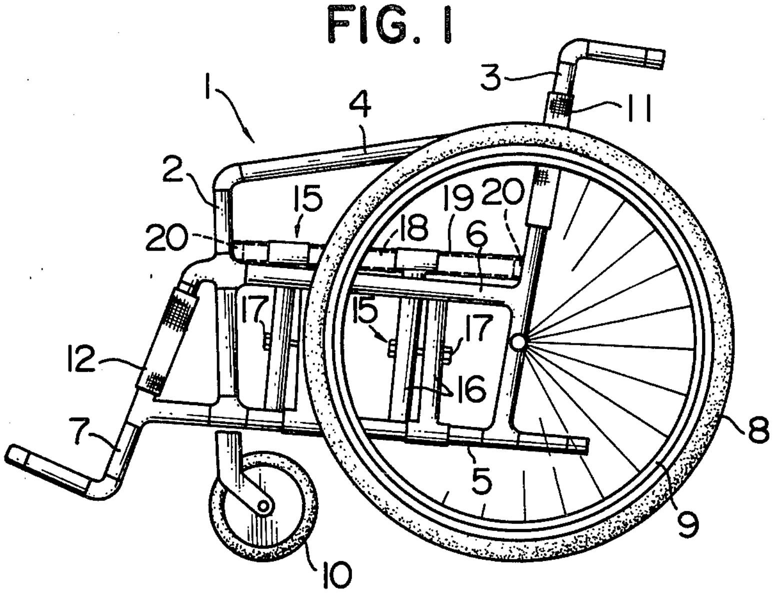
FIG. 1 is a side view of one embodiment of the wheelchair according to the invention.
Figure 2:
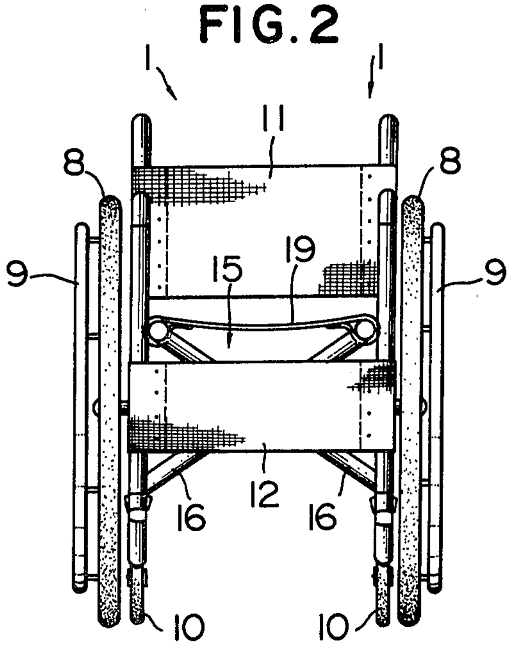
FIG. 2 is a front view of the wheelchair shown in FIG. 1.

The invention will now be described in detail by referring to a preferred embodiment thereof shown in the accompanying drawings.

As shown, a pair of frames 1 located on opposite sides of the wheelchair comprises a plurality of tubular members formed of fiber-reinforced plastic material connected together through suitable joints or by joining into a desired configuration. More specifically, each frame comprises a front post member 2, a rear post member 3, an arm tubular member 4 connecting the front post member 2 and rear post member 3 together at upper ends, a base tubular member 5 connecting the front post member 2 and rear post member 3 at lower ends, an intermediate tubular member 6 connecting the front post member 2 and rear post member 3 together in intermediate positions, and a leg member 7 connected to a forward end of the base tubular member 5. Any other tubular member may be connected to the frame 1 when necessary.

Each frame 1 is provided with a drive wheel 8 equipped with a hand ring 9, and a castor 10. The pair of frames 1 are connected together by a back rest 11 formed of a web of flexible material, and a leg rest 12 also formed of a web of flexible material. Connecting members 15 each comprising a pair of yokes 16 crossing each other also connects the pair of frames 1 together.

The yokes 16 of the connecting member 15 are pivotally supported at lower ends on the base tubular members 5 of the respective frames 1, and connected to each other for relative pivotal movement through a pin 17 at an intersection located midway between upper and lower ends of the yokes 16. Seat tubular members 18 are each connected to upper ends of the yokes 16 and extend parallel to the base members 5. In the embodiment shown and described hereinabove, two pairs of yokes 16 are provided, with the yokes 16 of each pair crossing each other. However, the invention is not limited to this specific number of pairs of yokes and one pair of yokes or more than two pairs of yokes may be provided depending on the design.

A seat 19 formed of a web of flexible material similar to the flexible material forming the webs used as the back rest 11 and leg rest 12 is hung between the seat tubular members 18. The seat 19, back rest 11 and leg rest 12 have suitable dimensions to fit the sizes of the sitter and are secured at opposite ends to the frames 1 or the seat tubular members 18 by suitable means, including binding, screwing, etc. Preferably the webs constituting the back rest 11, leg rest 12 and seat 19 can have their lengths adjusted to suit the sizes of the sitters.

In the wheelchair of the aforesaid construction, the seat tubular members 18 have covers 20 attached to their opposite ends and formed of synthetic resinous material which covers are brought into pressing engagement with the front post members 2 and rear post members 3 of the frames 1 located on opposite sides of the wheelchair, when the left and right frames 1 are spaced apart from each other to bring the back rest 11 and leg rest 12 to a taut condition.

The wheelchair of the aforesaid construction can be assembled by spacing the left and right frames 1 apart from each other to bring the back rest 11 and leg rest 12 to a taut condition. If a person using the wheelchair sits on the seat 19, the seat tubular members 18 are brought at opposite ends into pressing engagement with the front post members 2 and rear post members 3 of the frames 1. Since the opposite ends of the seat tubular members 18 are not guided by the front post members 2 and rear post members 3 of the frames 1 and their intermediate portions are neither guided nor supported by the intermediate tubular members 6, it is possible to readily adjust the width of the wheelchair as measured between the left and right frames 1 by adjusting the lengths of the seat 19, back rest 11 and leg rest 12. The wheelchair as a whole has a flexible structure capable of absorbing shocks transmitted from the drive sheels 8 and castors 10 before they reach the sitter.

When it is desired to disassemble the wheelchair of the aforesaid construction, the end can be attained by lifting the seat 19 to remove the seat tubular members 18 from pressing engagement with the front post members 2 and rear post members 3 of the frames 1 and then moving the frames 1 toward each other.

From the foregoing description, it will be appreciated that the wheelchair according to the invention is simple in construction, light in weight and capable of adjusting the sizes of the seat, back rest and leg rest to fit the sizes of the persons who use the wheelchair while having required rigidity and strength.

What is claimed is:

1. A wheelchair comprising:

a pair of frames each frame comprising a base tubular member, and a front post member and a rear post member mounted in upright positions at forward and rearward ends of said base tubular member respectively and secured thereto;

a pair of drive wheels each equipped with a hand ring attached concentrically to the drive wheel for rotation therewith, and a pair of castors, each drive wheel and each castor being rotatably supported on one of said frames;

a back rest and a leg rest each formed of a web of flexible material connecting said pair of frames together;

at least one pair of yoke members intersecting at intermediate points and connected together for relative pivotal movements at an intersection while being supported at lower ends by said base tubular members for pivotal movement about the axes of the base tubular members;

a pair of seat tubular members each having a length greater than the distance between the front post member and rear post member of each said frame and secured to upper ends of said yokes substantially in parallel to said base tubular members; and a seat formed of a web of flexible material hung between said pair of seat tubular members;

wherein said seat tubular members are brought into pressing engagement at opposite ends with said front post members and said rear post members of said frames when the pair of frames are spaced apart from each other to bring the back rest and leg rest to a taut condition.

* * * * *